United States Patent
Yoshida et al.

(10) Patent No.: US 9,279,354 B2
(45) Date of Patent: Mar. 8, 2016

(54) CONTROL UNIT FOR UREA-WATER ADDING DEVICE

(71) Applicant: DENSO CORPORATION, Kariya, Aichi-pref. (JP)

(72) Inventors: Takanori Yoshida, Chiryu (JP); Masakazu Toukairin, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/224,321

(22) Filed: Mar. 25, 2014

(65) Prior Publication Data
US 2014/0290221 A1 Oct. 2, 2014

(30) Foreign Application Priority Data
Apr. 2, 2013 (JP) .................................. 2013-76850

(51) Int. Cl.
*F01N 3/00* (2006.01)
*F01N 3/20* (2006.01)

(52) U.S. Cl.
CPC ............ *F01N 3/208* (2013.01); *F01N 2610/02* (2013.01); *F01N 2610/105* (2013.01); *F01N 2610/1486* (2013.01); *Y02T 10/24* (2013.01)

(58) Field of Classification Search
USPC .............................. 60/286, 295, 300, 301, 303
See application file for complete search history.

(56) References Cited

U.S. PATENT DOCUMENTS

| | | | | |
|---|---|---|---|---|
| 5,233,831 | A * | 8/1993 | Hitomi et al. | 60/284 |
| 8,303,174 | B2 * | 11/2012 | Kasahara | 374/144 |
| 8,448,426 | B2 * | 5/2013 | Peucat et al. | 60/295 |
| 8,820,052 | B2 * | 9/2014 | Levin et al. | 60/286 |
| 8,875,493 | B2 * | 11/2014 | Chmielewski et al. | 60/286 |
| 8,875,495 | B2 | 11/2014 | Perrin | |
| 8,931,259 | B2 * | 1/2015 | Yan et al. | 60/286 |
| 2007/0251226 | A1 | 11/2007 | Kaneko | |
| 2010/0229532 | A1 | 9/2010 | Ohno | |

FOREIGN PATENT DOCUMENTS

| | | |
|---|---|---|
| JP | 2002-332827 A | 11/2002 |
| JP | 2008-286096 A | 11/2008 |
| JP | 2010-164014 A | 7/2010 |

OTHER PUBLICATIONS

Office Action mailed Mar. 17, 2015 issued in corresponding JP patent application No. 2013-076850 (and English translation).

* cited by examiner

*Primary Examiner* — Binh Q Tran
(74) *Attorney, Agent, or Firm* — Posz Law Group, PLC

(57) ABSTRACT

A heating-controller controls an electric power supply from a battery to a urea-water heater based on a voltage of the battery detected by a voltage detector and an engine-state of an internal combustion engine obtained by an engine-state detector. When a voltage of the battery is low or when the internal combustion engine stops, the heating-controller prohibits the electric power supply from the battery to the urea-water heater. A urea-water adding device can avoid an excess decrease of a battery power by intermittently energizing the urea-water heater according to the engine-state of an internal combustion engine and the battery voltage VB.

5 Claims, 6 Drawing Sheets

CONTROL UNIT FOR UREA-WATER ADDING DEVICE

CROSS-REFERENCE TO RELATED APPLICATION

This is based on Japanese Patent Application No. 2013-76850 filed on Apr. 2, 2013, the disclosure of which is incorporated herein by reference.

TECHNICAL FIELD

The present disclosure relates to a control unit controlling a urea-water adding device which adds urea water to exhaust gas in order to purify the exhaust gas emitted from an internal combustion engine.

BACKGROUND

Conventionally, a urea SCR (Selective Catalytic Reduction) system is known. In the urea SCR system, nitrogen oxides (NOx) contained in exhaust gas are reduced by adding urea water. The urea water is a water solution of urea. When an atmospheric temperature falls down to a specified temperature, the urea water for the urea SCR system is frozen. If the urea water is frozen, the urea water cannot be added to exhaust gas. JP-2005-315206A (EP-1741887A1) shows a urea-water adding device having a heater in order to thaw the frozen urea water.

The heater receives electricity from a battery mounted to a vehicle. When the heater is energized with the engine stopped, the battery may go dead.

SUMMARY

It is an object of the present disclosure to provide a control unit controlling a urea-water adding device, which can avoid an excess decrease of a battery power by intermittently energizing a heater according to an engine-state of an internal combustion engine and a battery voltage.

A control unit has a heating-controller which controls an electric power supply from a battery to a urea-water heater based on a voltage of a battery detected by a voltage detector and an engine-state of an internal combustion engine obtained by an engine-state detector. That is, the heating-controller controls the urea-water heater according to whether the voltage of the battery is greater than a predetermined voltage and whether an internal combustion engine runs. When the voltage of the battery is low or when the internal combustion engine stops, the heating-controller prohibits the electric power supply from the battery to the urea-water heater.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Referring to drawings, exhaust gas purifying systems to which a control unit for urea-water adding device is applied will be described hereinafter.

First Embodiment

Figure 1:
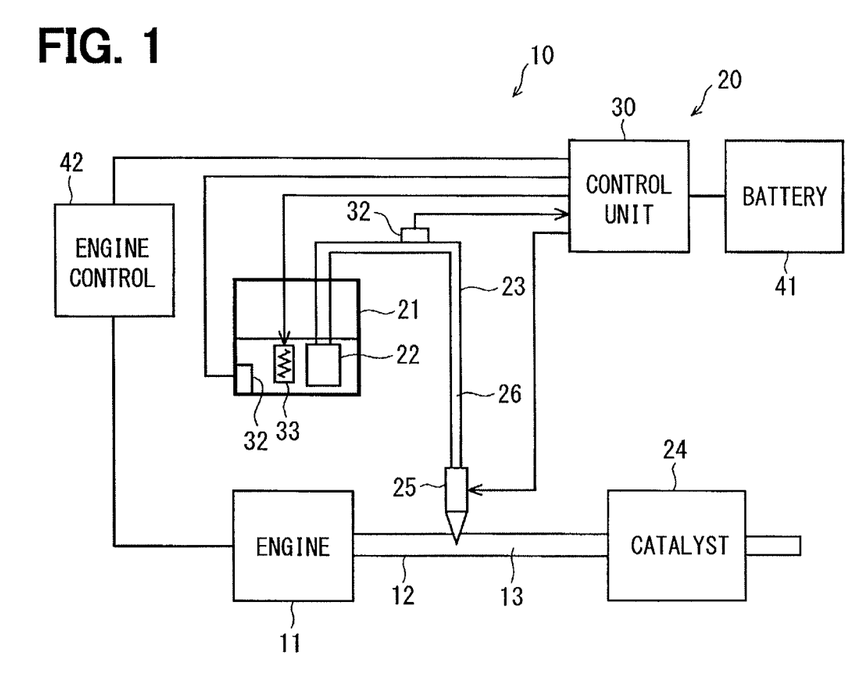
FIG. 1 is a schematic view showing an exhaust gas purification system to which a control unit of a urea-water adding device is applied according to a first embodiment.

The exhaust gas purifying system 10 shown in FIG. 1 configures an SCR system which adds urea water to an exhaust gas emitted from an internal combustion engine 11. The exhaust gas is exhausted to the atmosphere via an exhaust passage 13 defined by an exhaust pipe 12. The internal combustion engine 11 may be a diesel engine, a gasoline engine or a gas-turbine engine. Also, the exhaust gas purifying system 10 may be applied to not only the internal combustion engine 11 but also a power generation unit.

The exhaust gas purifying system 10 has a urea-water adding device 20 which adds urea water to an exhaust gas. The urea-water adding device 20 is equipped with a urea-water tank 21, a urea-water pump 22, a urea-water pipe 23, a reducing catalyst 24, and an injector 25. The urea-water tank 21 stores the urea water. The urea-water pump 22 is accommodated in the urea-water tank 21. The urea-water pipe 23 defines a urea-water passage 26. The reducing catalyst 24 is provided in the exhaust passage 13. One end of the urea-water pipe 23 is connected with the urea-water pump 22, and another end of the urea-water pipe 23 is connected with the injector 25. The urea water discharged from the urea-water pump 22 is supplied to the injector 25 via the urea-water passage 26. The injector 25 is disposed on the exhaust pipe 12 to inject the urea water into the exhaust passage 13. The urea water injected from the injector 25 and the exhaust gas emitted from the internal combustion engine 11 are mixed in the exhaust passage 13 and then flows into the reducing catalyst 24. NOx contained in the exhaust gas is reduced by the urea water in the reducing catalyst 24.

Figure 2:
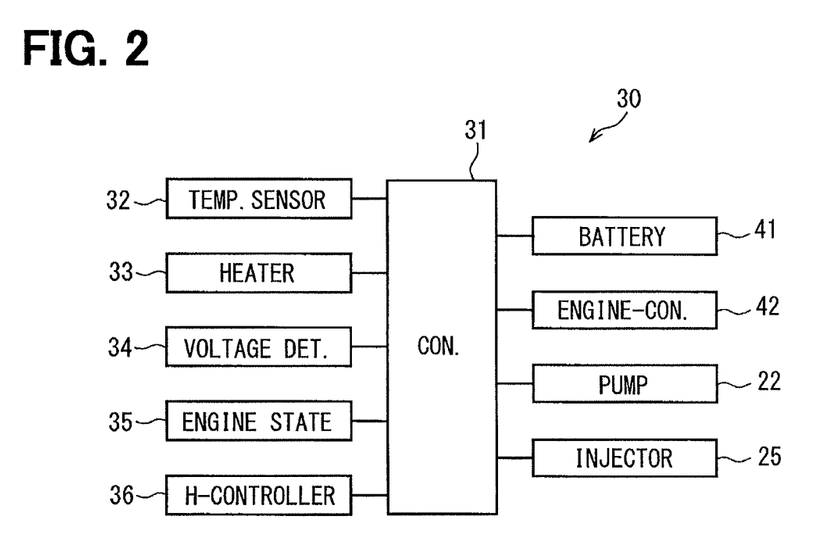
FIG. 2 is a block diagram illustrating a control unit of a urea-water adding device according to the first embodiment.

A control unit 2 of the urea-water adding device 20 controls a urea water injection and a thawing of the frozen urea water. As shown in FIG. 2, the control unit 30 is provided with a controller 31, a urea-water temperature sensor 32, a urea-water heater 33, a voltage detector 34, an engine-state detector 35 and a heating-controller 36. The controller 31 is a microcomputer having a CPU, a ROM, and a RAM. The controller 31 controls the urea-water adding device 20 according to computer programs stored in the ROM.

The urea-water temperature sensor 32 detects a temperature of the urea water in the urea-water adding device 20. As shown in FIG. 1, the urea-water temperature sensor 32 is disposed on the urea-water pipe 23. A urea-water temperature sensor 32 transmits a signal indicative of the urea-water temperature to the controller 31. It should be noted that the urea-water temperature may be estimated based on an outside air temperature and an engine coolant temperature.

The urea-water heater 33 heats the urea water in the urea-water adding device 20. That is, the urea-water heater 33 heats the urea water flowing in a urea-water supply passage including the urea-water tank 21, the urea-water pipe 23 and the injector 25. In the present embodiment, the urea-water heater 33 is disposed in the urea-water tank 21.

The control unit 30 is electrically connected to a battery 41. The control unit 30 drives the urea-water pump 22, the injector 25 of the urea-water adding device 20. The voltage detector 34 detects an excess supply voltage of the battery 41. A voltage detector 34 transmits an electric signal indicative of the voltage (VB) of the battery 41 to the controller 31. The voltage of the battery 41 decreases along with a discharge. That is, the voltage of the battery 41 corresponds to the excess supply voltage. Then, the controller 31 obtains the excess supply voltage of the battery 41.

The engine-state detector 35 and the heating-controller 36 function by executing computer programs. It should be noted that the engine-state detector 35 and the heating-controller 36 can be configured by software, hardware or combination thereof.

The engine-state detector 35 detects whether the internal combustion engine 11 runs. Specifically, the engine-state detector 35 obtains data about whether the internal combustion engine 11 runs from the engine-controller 42. The engine-state detector 35 obtains data such as an engine speed, an intake air flow rate and a fuel injection quantity. The heating-controller 36 controls the electric power supply from the battery 41 to a urea-water heater 33 based on the voltage of the battery 41 detected by the voltage detector 34 and the engine-state of the internal combustion engine 11 obtained by the engine-state detector 35.

Figure 3:
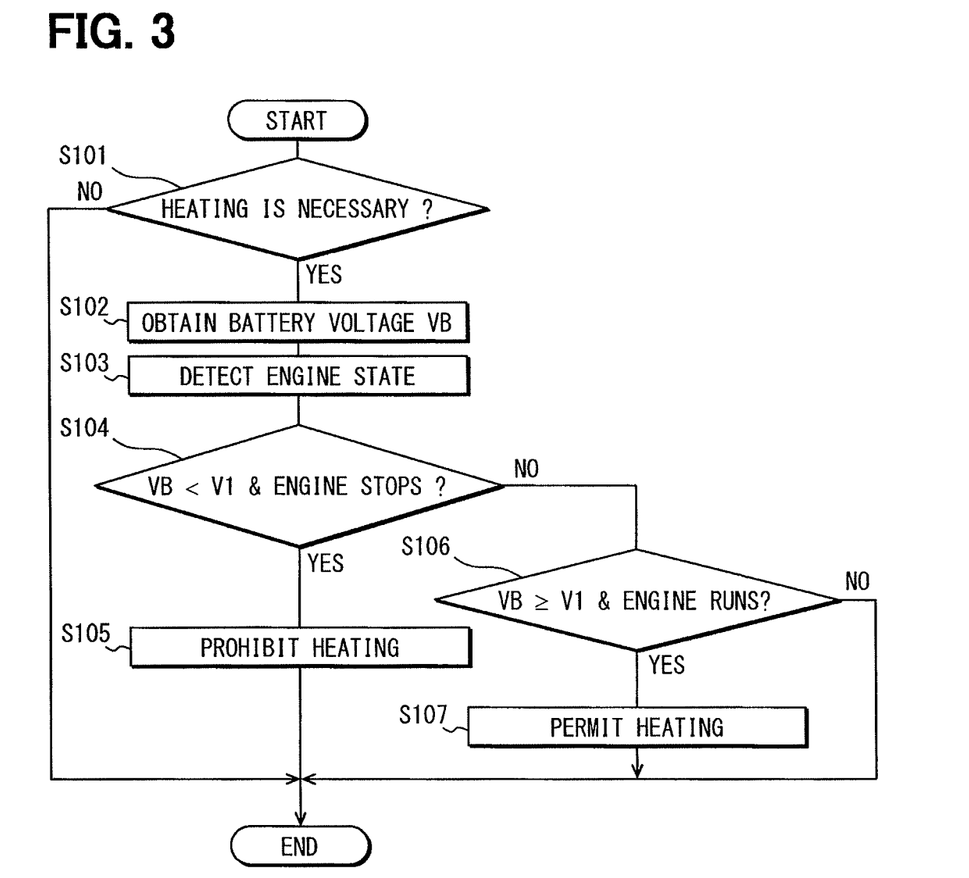
FIG. 3 is a flowchart showing an operation of the control unit of the urea-water adding device according to the first embodiment.

Referring to FIG. 3, an operation of the control unit 30 will be described hereinafter.

In S101, the heating-controller 36 determines whether it is necessary to heat the urea water by the urea-water heater 33. For example, when the outside air temperature is high enough and it is unlikely that the urea water is frozen, it is unnecessary to heat the urea water. Therefore, the heating-controller 36 determines whether it is necessary to heat the urea water based on the urea water temperature detected by the urea-water temperature sensor 32. When the answer is NO in S101, the procedure is terminated.

When the answer is YES, the procedure proceeds to S102 in which the heating-controller 36 obtains the battery voltage VB from the voltage detector 34. In S103, the engine-state detector 35 obtains data about the internal combustion engine 11 from an engine-controller 42 to determine whether the internal combustion engine 11 runs.

In S104, the heating-controller 36 determines whether the battery voltage VB obtained in S102 is less than a lower-limit voltage V1 and the internal combustion engine 11 stops. When the answer is YES in S104, the procedure proceeds to S105 in which the heating-controller 36 prohibits the urea-water heater 33 from heating the urea water. That is, the heating-controller 36 stops the electric power supply from the battery 41 to the urea-water heater 33. Thereby, the urea-water heater 33 does not heat the urea water. Moreover, the electric power of the battery 41 is not consumed by the urea-water heater 33.

When the answer is NO in S104, the procedure proceeds to S106. In S106, the heating-controller 36 determines whether the battery voltage VB is greater than or equal to the lower-limit voltage V1 and the internal combustion engine 11 runs. When the answer is YES in S106, the heating-controller 36 permits an energization of the urea-water heater 33 to heat the urea water in S107. That is, when the voltage of the battery 41 is greater than or equal to the lower-limit voltage V1 and the internal combustion engine 11 runs, the heating-controller 36 permits the electric power supply from the battery 41 to the urea-water heater 33. Thereby, the urea-water heater 33 can heat the urea water. When the voltage of the battery 41 is greater than or equal to the lower-limit voltage V1, the battery 41 has the electric excess supply capacity, Thus, even when the electric power is supplied from the battery 41 to the urea-water heater 33, no excessive load is applied to the battery 41. When the answer is NO in S106, the procedure is terminated.

As described above, according to the first embodiment, when the voltage of the battery 41 is less than a lower-limit voltage V1 and the internal combustion engine 11 stops, the heating-controller 36 prohibits the urea-water heater 33 from heating the urea water. When the battery voltage VB is low or the internal combustion engine 11 stops, the battery 41 does not have the electric excess supply capacity. The heating-controller 36 prohibits the energization of the urea-water heater 33 to avoid the consumption of the electric power of the battery 41. Meanwhile, when the voltage of the battery 41 is greater than the lower-limit voltage V1 and the internal combustion engine 11 runs, the heating-controller 36 permits the energization of the urea-water heater 33 to heat the urea water. Even when the urea-water heater 33 consumes electric power, an electric load of the battery 41 is small. Therefore, an excess consumption of the electric power of the battery 41 can be avoided, so that the internal combustion engine 11 can run stably.

Second Embodiment

Figure 4:
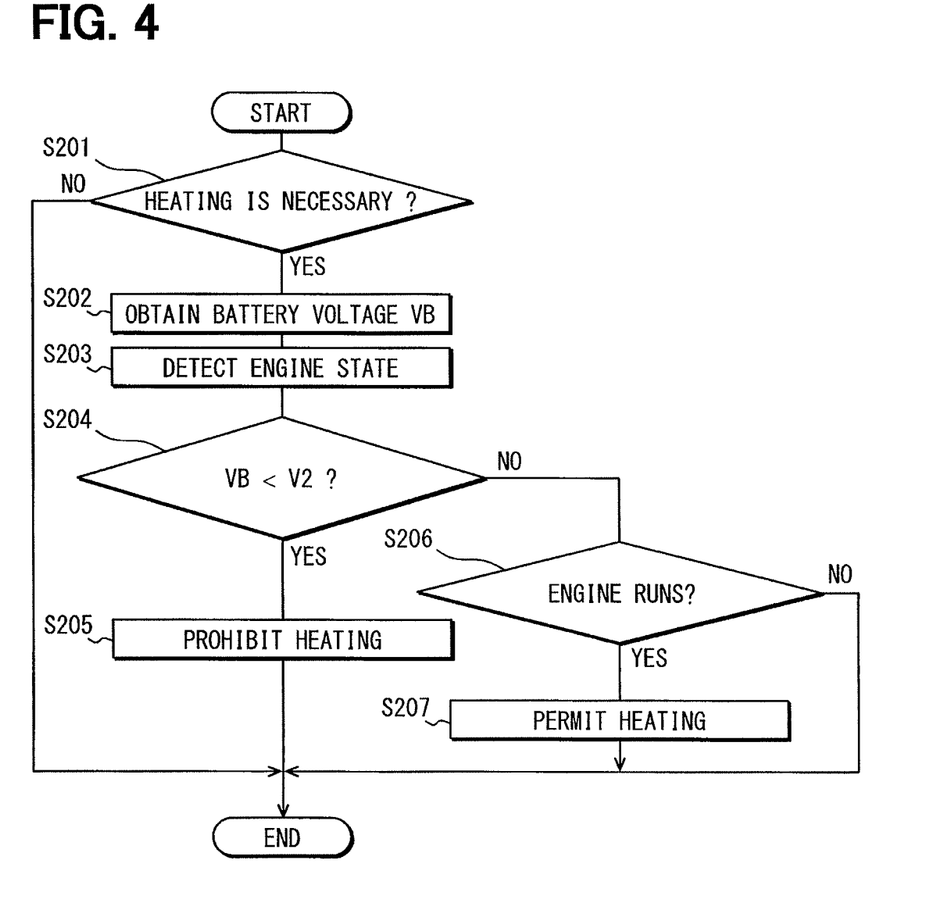
FIG. 4 is a flowchart showing an operation of the control unit of the urea-water adding device according to a second embodiment.

A control unit 30 of a urea-water adding device 20 will be described according to a second embodiment, hereinafter. The mechanical and electrical configurations of the urea-water adding devices 20 and the control unit 30 are the same as those of the first embodiment. Referring to FIG. 4, an operation of the control unit 30 will be explained below. In the second and the successive embodiments, the same procedure in the first embodiment will not be reiterated.

In S201, the heating-controller 36 determines whether it is necessary to heat the urea water by the urea-water heater 33. When the answer is NO in S201, the procedure is terminated. When the answer is YES in S201, the procedure proceeds to S202 in which the heating-controller 36 obtains the battery voltage VB from the voltage detector 34. In S203, the engine-state detector 35 detects whether the internal combustion engine 11 runs.

In S204, the heating-controller 36 determines whether the battery voltage VB obtained in S202 is less than a second lower-limit voltage V2. It should be noted that the second lower-limit voltage V2 may be the same value as the lower-limit voltage V1 described in the first embodiment. Alternatively, the second lower-limit voltage V2 may be different from the lower-limit voltage V1. When the answer is YES in S204, the procedure proceeds to S205 in which the heating-controller 36 prohibits the urea-water heater 33 from heating the urea water. That is, when the voltage of the battery 41 is less than the second lower-limit voltage V2, the heating-controller 36 prohibits the electric power supply from the battery 41 to the urea-water heater 33 without respect to the engine-state of the internal combustion engine 11. Thereby, the urea-water heater 33 does not heat the urea water. Moreover, the electric power of the battery 41 is not consumed by the urea-water heater 33.

When the answer is NO in S204, the procedure proceeds to S206 in which the heating-controller 36 determines whether the internal combustion engine 11 runs. When the answer is YES in S206, the heating-controller 36 permits an energization of the urea-water heater 33 to heat the urea water in S207. That is, when the internal combustion engine 11 runs, the heating-controller 36 permits the electric power supply from the battery 41 to the urea-water heater 33. Thereby, the urea-water heater 33 can heat the urea water. Moreover, while the internal combustion engine 11 runs, the battery 41 is charged by an alternator (not shown). An excessive electric load is not applied to the battery 41. When the answer is NO in S206, the procedure is terminated.

As described above, according to the second embodiment, when the voltage of the battery 41 is less than the second lower-limit voltage V2, the heating-controller 36 prohibits the urea-water heater 33 from heating the urea water even in a case the internal combustion engine 11 runs. That is, when the battery 41 does not have the electric excess supply capacity enough, the energization of the urea-water heater 33 is avoided without respect to whether the internal combustion engine 11 runs. Meanwhile, when the voltage of the battery 41 is greater than the second lower-limit voltage V2 and the internal combustion engine 11 runs, the heating-controller 36 permits the energization of the urea-water heater 33 to heat the urea water. While the internal combustion engine 11 runs, the battery 41 is charged by the alternator. Thus, an excessive electric load is not applied to the battery 41 even when the urea-water heater 33 consumes the electric power. Therefore, an excess consumption of the electric power of the battery 41 can be avoided, so that the internal combustion engine 11 can run stably.

Third Embodiment

Figure 5:
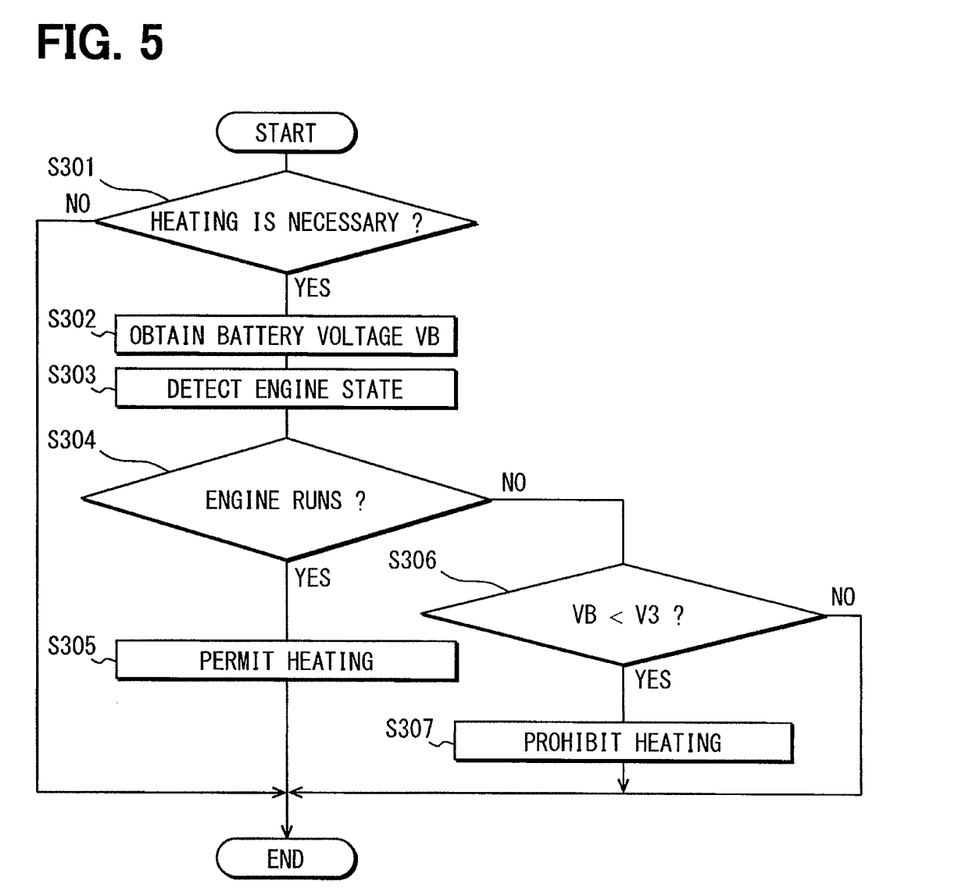
FIG. 5 is a flowchart showing an operation of the control unit of the urea-water adding device according to a third embodiment.

A control unit 30 of a urea-water adding device 20 will be described according to a third embodiment, hereinafter. The mechanical and electrical configurations of the urea-water adding devices 20 and the control unit 30 are the same as those of the first embodiment. Referring to FIG. 5, an operation of the control unit 30 will be explained below.

In S301, the heating-controller 36 determines whether it is necessary to heat the urea water by the urea-water heater 33. When the answer is NO in S301, the procedure is terminated. When the answer is YES, the procedure proceeds to S302 in which the heating-controller 36 obtains the battery voltage VB from the voltage detector 34. In S303, the engine-state detector 35 detects a condition of the internal combustion engine 11.

In S304, the heating-controller 36 determines whether the internal combustion engine 11 runs. When the answer is YES in S304, the heating-controller 36 permits an energization of the urea-water heater 33 to heat the urea water in S305. That is, when the internal combustion engine 11 runs, the heating-controller 36 permits the electric power supply from the battery 41 to the urea-water heater 33 without respect to the voltage of the battery 41. Thereby, the urea-water heater 33 can heat the urea water. Moreover, while the internal combustion engine 11 runs, the battery 41 is charged by an alternator (not shown). An excessive electric load is not applied to the battery 41.

When the answer is NO in S304, the heating-controller 36 determines whether the battery voltage VB is less than a third lower-limit voltage V3 in S306. It should be noted that the third lower-limit voltage V3 may be the same value as the lower-limit voltage V1 or the second lower-limit voltage V2. Alternatively, the third lower-limit voltage V3 may be different from the lower-limit voltages V1, V2. When the answer is YES in S306, the procedure proceeds to S307 in which the heating-controller 36 prohibits the urea-water heater 33 from heating the urea water. That is, the heating-controller 36 prohibits the electric power supply from the battery 41 to the urea-water heater 33. Thereby, the urea-water heater 33 does not heat the urea water. Moreover, the electric power of the battery 41 is not consumed by the urea-water heater 33. When the answer is NO in S306, the procedure is terminated.

As described above, according to the third embodiment, even when the voltage of the battery 41 is low, the heating-controller 36 permits the urea-water heater 33 to heat the urea water in a case that the internal combustion engine 11 runs. That is, while the internal combustion engine 11 runs, the battery 41 is charged by the alternator. An excessive electric load is not applied to the battery 41 even when the urea-water heater. 33 consumes the electric power. Also, when the internal combustion engine 11 stops, the heating-controller 36 prohibits the energization of the urea-water heater 33 as long as the voltage of the battery 41 is less than the third lower-limit voltage V3. Therefore, an excess consumption of the electric power of the battery 41 can be avoided, so that the internal combustion engine 11 can run stably.

Fourth Embodiment

Figure 6:
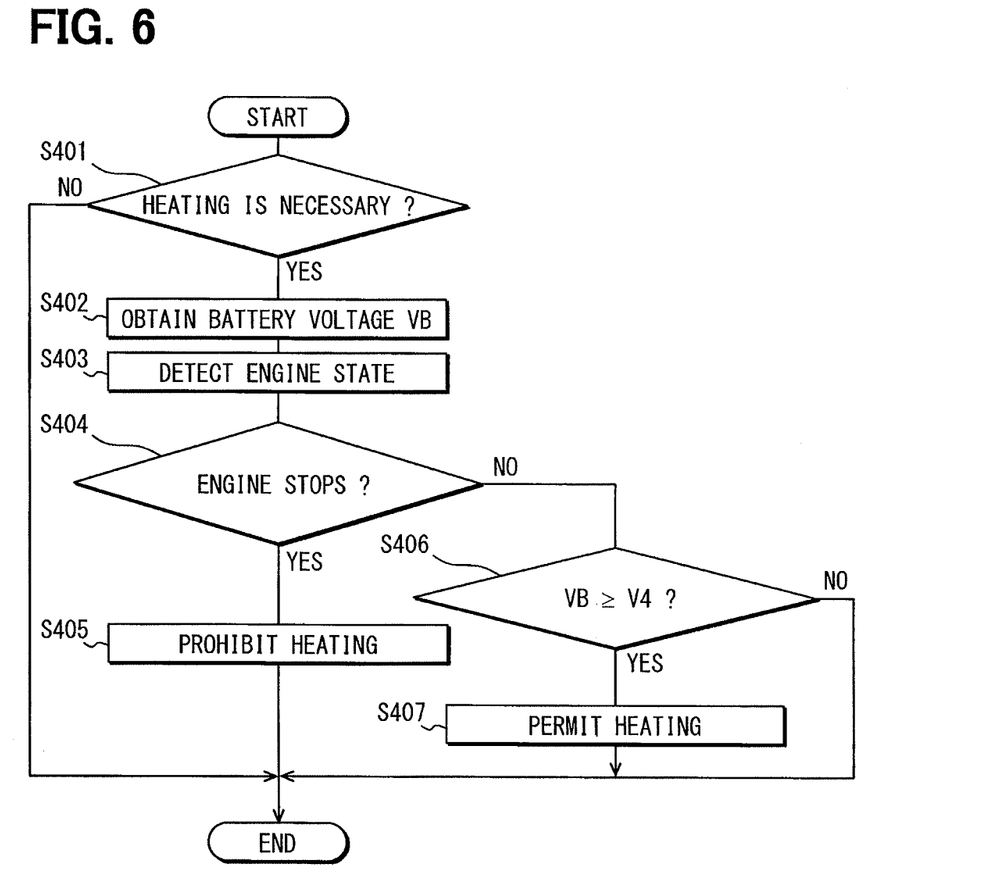
FIG. 6 is a flowchart showing an operation of the control unit of the urea-water adding device according to a fourth embodiment.

A control unit 30 of a urea-water adding device 20 will be described according to a fourth embodiment, hereinafter. The mechanical and electrical configurations of the urea-water adding devices 20 and the control unit 30 are the same as those of the first embodiment. Referring to FIG. 6, an operation of the control unit 30 will be explained below.

In S401, the heating-controller 36 determines whether it is necessary to heat the urea water by the urea-water heater 33. When the answer is NO in S401, the procedure is terminated. When the answer is YES, the procedure proceeds to S402 in which the heating-controller 36 obtains the battery voltage VB from the voltage detector 34. In S403, the engine-state detector 35 detects a condition of the internal combustion engine 11.

In S404, the heating-controller 36 determines whether the internal combustion engine 11 stops. When the answer is YES in S404, the heating-controller 36 prohibits the energization of the urea-water heater 33 in S405. That is, when the internal combustion engine 11 stops, the heating-controller 36 prohibits the electric power supply from the battery 41 to the urea-water heater 33 without respect to the voltage of the battery 41. Thereby, the urea-water heater 33 does not heat the urea water.

When the answer is NO in S404, that is, when the internal combustion engine 11 runs, the heating-controller 36 determines whether the battery voltage VB is greater than or equal to a fourth lower-limit voltage V4 in S406. It should be noted that the fourth lower-limit voltage V4 may be the same value as any one of the lower-limit voltages V1, V2 and V3. Alternatively, the fourth lower-limit voltage V4 may be different from those voltages. When the answer is YES in S406, the procedure proceeds to S407 in which the heating-controller 36 permits the urea-water heater 33 to heat the urea water. That is, the heating-controller 36 permits the electric power supply from the battery 41 to the urea-water heater 33. Thereby, the urea-water heater 33 can heat the urea water. When the answer is NO in S406, the procedure is terminated.

Also, when the internal combustion engine 11 stops, the heating-controller 36 prohibits the energization of the urea-water heater 33 even in a case that the voltage of the battery 41 is not less than the fourth lower-limit voltage V4. That is, when the internal combustion engine 11 stops, the heating-controller 36 prohibits the electric power supply from the battery 41 to the urea-water heater 33 without respect to the voltage of the battery 41. Also, when the internal combustion engine 11 runs and the voltage of the battery 41 is not less than the fourth lower-limit voltage V4, the heating-controller 36 permits the energization of the urea-water heater 33. While the internal combustion engine 11 runs and the voltage of the battery 41 is greater than or equal to the fourth lower-limit voltage V4, an excessive electric load is not applied to the battery 41 even when the urea-water heater 33 consumes the electric power. Therefore, an excess consumption of the electric power of the battery 41 can be avoided, so that the internal combustion engine 11 can run stably.

Fifth Embodiment

Figure 7:
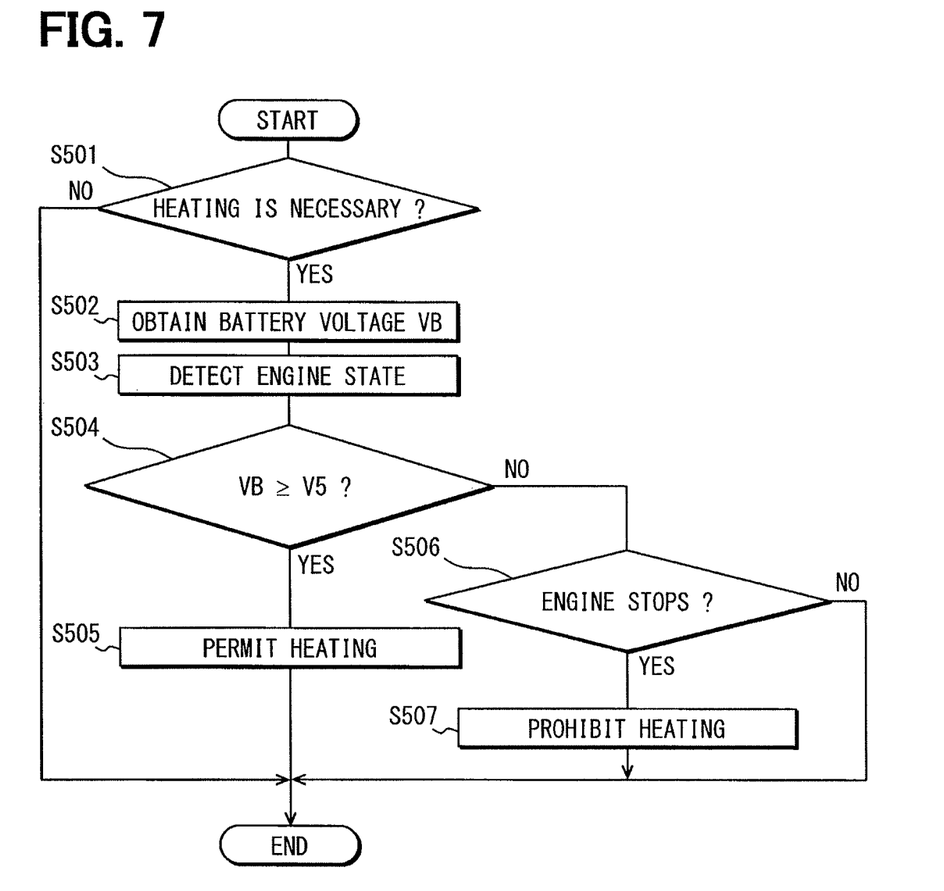
FIG. 7 is a flowchart showing an operation of the control unit of the urea-water adding device according to a fifth embodiment.

A control unit 30 of a urea-water adding device 20 will be described according to a fifth embodiment, hereinafter. The mechanical and electrical configurations of the urea-water adding devices 20 and the control unit 30 are the same as those of the first embodiment. Referring to FIG. 7, an operation of the control unit 30 will be explained below.

In S501, the heating-controller 36 determines whether it is necessary to heat the urea water by the urea-water heater 33. When the answer is NO in S501, the procedure is terminated. When the answer is YES, the procedure proceeds to S502 in which the heating-controller 36 obtains the battery voltage VB from the voltage detector 34. In S503, the engine-state detector 35 detects a condition of the internal combustion engine 11.

In S504, the heating-controller 36 determines whether the battery voltage VB obtained in S502 is greater than or equal to a fifth lower-limit voltage V5. It should be noted that the fifth lower-limit voltage V5 may be the same value as any one of the lower-limit voltages V1. V2, and V4. Alternatively, the fifth lower-limit voltage V5 may be different from those voltages. When the answer is YES in S504, the procedure proceeds to S505 in which the heating-controller 36 permits the urea-water heater 33 to heat the urea water. That is, when the voltage of the battery 41 is greater than or equal to the fifth lower-limit voltage V5, the heating-controller 36 permits the electric power supply from the battery 41 to the urea-water heater 33 without respect to the engine-state of the internal combustion engine 11. Thereby, the urea-water heater 33 can heat the urea water.

When the answer is NO in S504, the procedure proceeds to S506 in which the heating-controller 36 determines whether the internal combustion engine 11 stops. When the answer is YES in S506, the heating-controller 36 prohibits the energization of the urea-water heater 33 in S507. That is, the heating-controller 36 prohibits the electric power supply from the battery 41 to the urea-water heater 33. Thereby, the urea-water heater 33 does not heat the urea water. When the answer is NO in S506, the procedure is terminated.

As described above, according to the fifth embodiment, when the voltage of the battery 41 is greater than or equal to the fifth lower-limit voltage V5, the heating-controller 36 permits the urea-water heater 33 to heat the urea water even in a case that the internal combustion engine 11 stops. That is, when the battery 41 has the electric excess supply capacity enough, the urea-water heater 33 is energized to thaw the frozen urea water without respect to whether the internal combustion engine 11 runs. Meanwhile, when the voltage of the battery 41 is greater than the fifth lower-limit voltage V5 and the internal combustion engine 11 stops, the heating-controller 36 prohibits the urea-water heater 33 from heating the urea water. While the internal combustion engine 11 stops, the battery 41 is not charged by the alternator. If the urea-water heater 33 heats the urea water, an excessive electric load is applied to the battery 41. According to the present embodiment, the heating-controller 36 prohibits the electric power supply from the battery 41 to the urea-water heater 33. Therefore, an excess consumption of the electric power of the battery 41 can be avoided, so that the internal combustion engine 11 can run stably.

The present invention is not limited to the embodiment mentioned above, and can be applied to various embodiments.

What is claimed is:

1. A control unit controlling an urea-water adding device which adds an urea water to an exhaust gas flowing through an exhaust passage of an internal combustion engine, the control unit comprising:
a urea-water temperature sensor detecting a temperature of the urea water in the urea-water adding device;
a urea-water heater heating the urea water in the urea-water adding device;
a voltage detector detecting a voltage of a battery which supplies an electric power to the urea-water heater;
an engine-state detector detecting whether the internal combustion engine runs; and
a heating-controller controlling an electric power supply from the battery to the urea-water heater based on the voltage of the battery detected by the voltage detector and an engine-state of the internal combustion engine detected by the engine-state detector, wherein
the heating-controller prohibits the electric power supply from the battery to the urea-water heater when the voltage of the battery detected by the voltage detector is less than a predetermined voltage and the engine-state detector detects a stop of the internal combustion engine, and
the heating-controller permits the electric power supply from the battery to the urea-water heater when the voltage of the battery detected by the voltage detector is not less than the predetermined voltage and the engine-state detector detects a running of the internal combustion engine.

2. A control unit controlling an urea-water adding device according to claim 1, wherein the heating-controller prohibits the electric power supply from the battery to the urea-water heater when the voltage of the battery detected by the voltage detector is less than a predetermined voltage even in a case the engine-state detector detects the running of the internal combustion engine.

3. A control unit controlling an urea-water adding device according to claim 1, wherein the heating-controller permits the electric power supply from the battery to the urea-water heater when the engine-state detector detects a running of the internal combustion engine and the voltage of the battery detected by the voltage detector is less than a predetermined voltage.

4. A control unit controlling an urea-water adding device according to claim 1, wherein the heating-controller prohibits the electric power supply from the battery to the urea-water heater when the engine-state detector detects a stop of the internal combustion engine and the voltage of the battery detected by the voltage detector is not less than a predetermined voltage.

5. A control unit controlling an urea-water adding device which adds a urea water to an exhaust gas flowing through an exhaust passage of an internal combustion engine, the control unit comprising:
a urea-water temperature sensor detecting a temperature of the urea water in the urea-water adding device;

a urea-water heater heating the urea water in the urea-water adding device;

a voltage detector detecting a voltage of a battery which supplies an electric power to the urea-water heater;

an engine-state detector detecting whether the internal combustion engine runs; and a heating-controller controlling an electric power supply from the battery to the urea-water heater based on the voltage of the battery detected by the voltage detector and an engine-state of the internal combustion engine detected by the engine-state detector, wherein the heating-controller permits the electric power supply from the battery to the urea-water heater when the voltage of the battery detected by the voltage detector is not less than a predetermined voltage and the engine-state detector detects a stop of the internal combustion engine.

\* \* \* \* \*